UNITED STATES PATENT OFFICE.

ROBERT RUTHERFORD DOUGLAS, OF DUNEDIN, NEW ZEALAND.

PROTECTOR FOR THE ROLLERS OF DREDGE-LADDERS, &c.

No 800,276.   Specification of Letters Patent.   Patented Sept. 26, 1905.

Application filed July 18, 1905. Serial No. 270,233.

*To all whom it may concern:*

Be it known that I, ROBERT RUTHERFORD DOUGLAS, engineer, of Dunedin, New Zealand, have invented certain new and useful Improvements in Protectors for the Rollers of Dredge-Ladders, Elevators, and the Like, of which the following is a specification.

The object of this invention is to provide a protector for the rollers, including the roller-spindles, of dredge-ladders, elevators, and the like, by means of which the wear and tear of the rollers and roller-spindles are taken by the protectors, which can be removed when worn, thus obviating the necessity of removing the rollers and roller-spindles, and so saving time and expense.

The protectors are simple in their attachment and can be applied readily to both the rollers and roller-spindles, no machining or shrinking being required. In consequence of the protector fitted to the roller taking all the wear and tear the roller itself may be made lighter and of soft metal.

This invention consists in the features and combination and arrangement of parts hereinafter described with reference to the accompanying drawings, in which the same numerals of reference indicate the same or similar parts.

Figure 1:
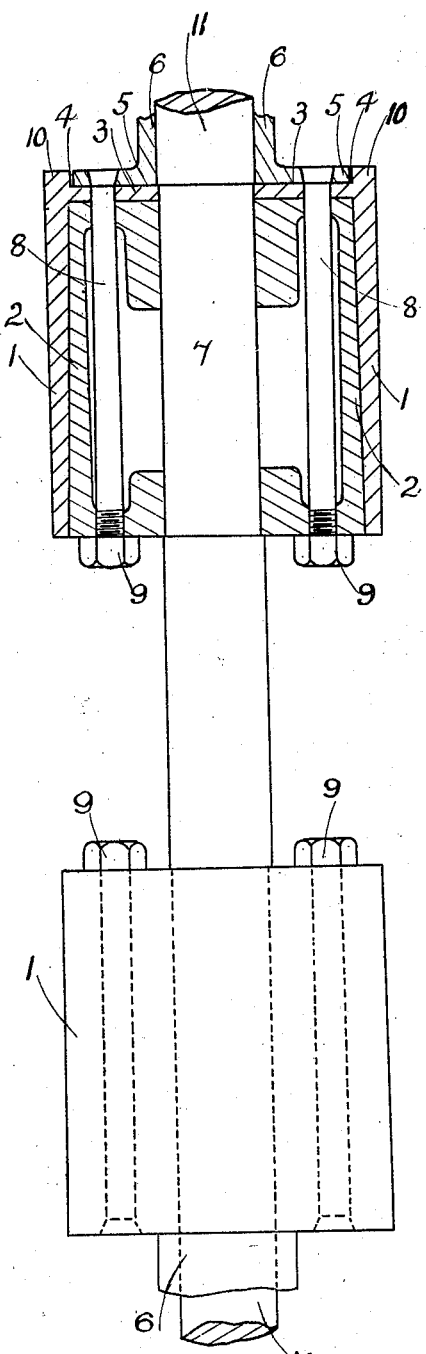
Figure 2:
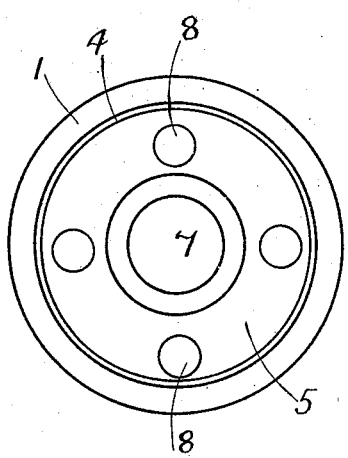

In the drawings, Figure 1 is a part-sectional view of the protectors in position on a ladder-roller and on the roller-spindle. Fig. 2 is an end view of Fig. 1.

There is a preferably cast-steel liner 1 of suitable diameter and length cast with a taper of preferably one-half inch in its bore and adapted to fit on the body of the roller 2, which is also made with a taper equal to that of the liner 1, but running the opposite way. The liners are left in the rough and not machined, so that in case of any variation in the sizes the taper allows the liner to bed or fit itself at some part of the taper of the roller.

The outer end of the liner 1 has a circular flange 3 and a rim 10, forming, with the flange, a recess 4 for the purpose of receiving a washer 5, provided with a liner acting as a bush 6 for the end 11 of the spindle 7. This washer 5 is secured to the liner 1 and the roller 2 by two or more bolts 8, which pass through the body of the roller 2, the flange 3, and the washer 5, binding them together on the nuts 9 being tightened up. The bush 6 protects the end 11 of the spindle 7. The washer by reason of its frictional grip of the flange 3, in conjunction with bolts 8, prevents the liner 1 from turning on the roller and the bush 6 from turning on the spindle. The liners 1 and 6 thus together form a combined protector for the rollers, including the ends of the spindles thereof.

Having now described my invention, what I claim as new, and desire to secure by Letters Patent, is—

1. Protector for the rollers of dredge-ladders elevators and the like consisting of the combination with a tapered roller of a correspondingly-tapered liner provided with a circular flange at one end and means for securing the flange to the roller substantially as described.

2. Protector for the rollers of dredge-ladders elevators and the like consisting of the combination with a tapered roller of a correspondingly-tapered liner provided with a circular flange and a rim at one end forming a recess, a washer provided with a bush, and means for securing the washer and liner to the roller substantially as described.

In witness whereof I have hereunto set my hand in presence of two witnesses.

ROBERT RUTHERFORD DOUGLAS.

Witnesses:
 A. J. PARK,
 AUDREY JACKSON.